Dec. 17, 1946.    R. T. PALMER    2,412,782
WET BULB THERMOMETER AND THERMOSTAT
Filed May 26, 1944    2 Sheets-Sheet 1
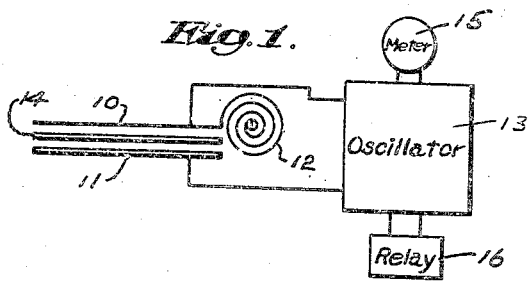
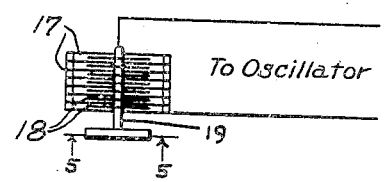
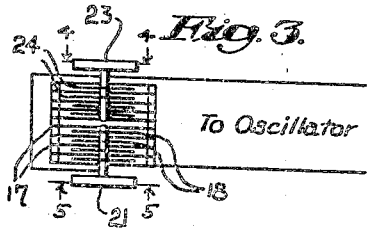
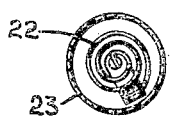
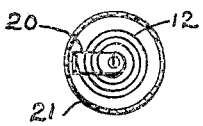
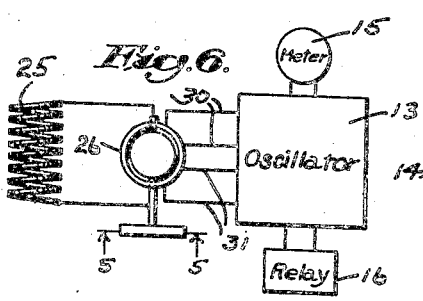
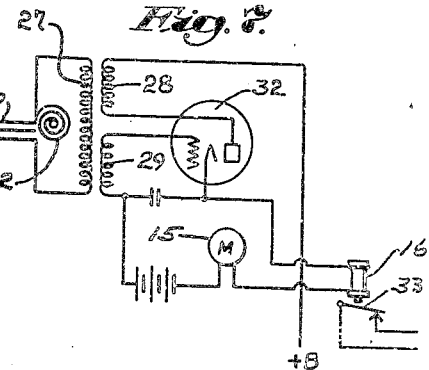
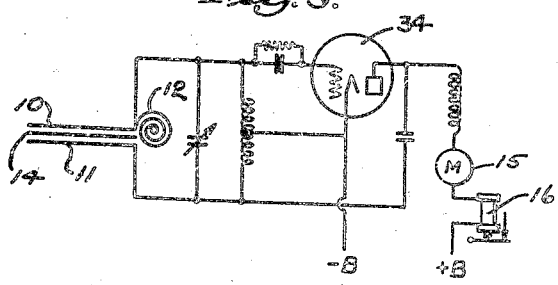
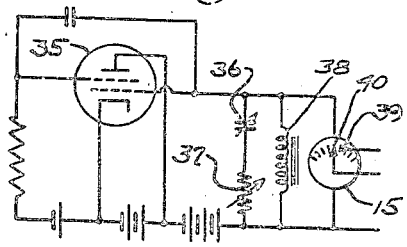
Inventor:
Robert T. Palmer Dec. 17, 1946.          R. T. PALMER          2,412,782
WET BULB THERMOMETER AND THERMOSTAT
Filed May 26, 1944                    2 Sheets-Sheet 2
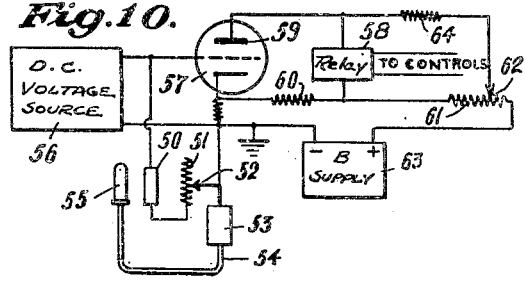
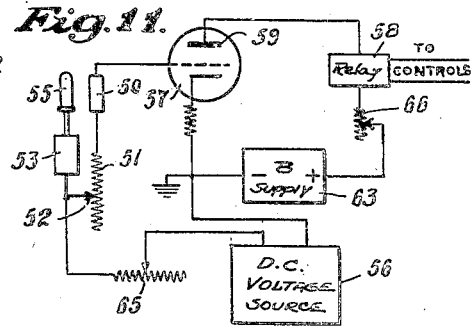
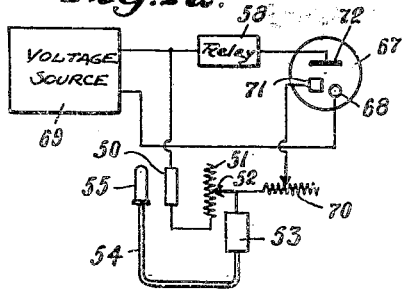
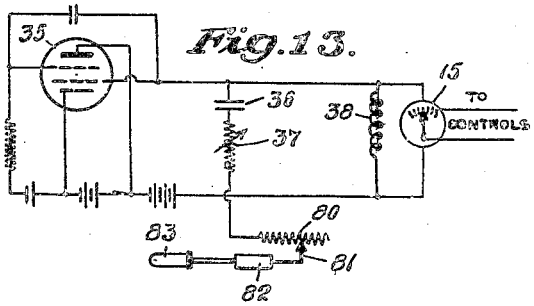
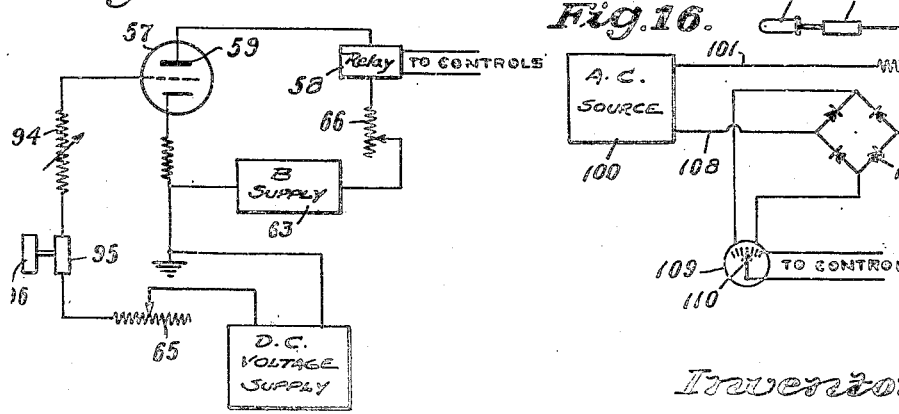
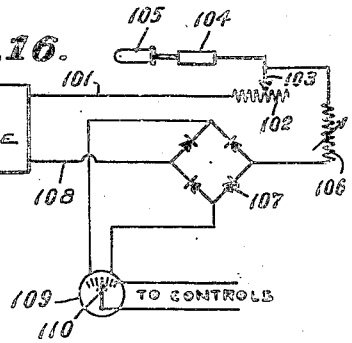
Inventor:
Robert T. Palmer Patented Dec. 17, 1946

2,412,782

UNITED STATES PATENT OFFICE 2,412,782

WET BULB THERMOMETER AND THERMOSTAT

Robert T. Palmer, Sharon, Mass.

Application May 26, 1944, Serial No. 537,507

12 Claims. (Cl. 236—44)

This invention relates to instruments responding to wet bulb temperature changes such as are commonly known as wet bulb thermometers and wet bulb thermostats.

This application is a continuation-in-part of by copending application, Serial No. 428,312, filed January 26, 1942.

Wet bulb thermostats are desirable for such duties as regulating air cooling systems in accordance with latent heat changes. The usual wet bulb thermostat is a dry bulb thermometer utilizing a water soaked wick around its bulb for obtaining a wet bulb depression through evaporative cooling. Such thermostats have not been extensively used due to the difficulties of supplying the correct amount of water to the wicks and of keeping the wicks clean in the out-of-way locations such as in ducts, where control thermostats are usually located.

This invention provides wet bulb thermostats and thermometers which do not require water supply and which are electronic in action.

This invention depends in principle, upon the fact that as shown by standard psychrometric charts, relative humidities, dry bulb temperatures and wet bulb temperatures are so related that the relations between any two of these three variables enable the third to be determined. For example, suppose it is desired that a wet bulb thermostat actuate a control at 70° F. wet bulb temperature. For this wet bulb temperature

| Relative humidity | Dry bulb temperature |
|---|---|
| Percent | Degrees |
| 80 | 75 |
| 70 | 77 |
| 60 | 80 |
| 50 | 84 |
| 40 | 88 |

This invention causes the varying factors of dry bulb temperature and relative humidity electronically to determine and to indicate wet bulb temperatures, and to actuate controls at predetermined wet bulb temperatures.

A moisture increase in the air to which a device embodying this invention is exposed, may cause a frequency or intensity change in electric current flow while an increase in the dry bulb temperature may cause an opposite frequency or intensity change in current flow. The said current flows are so evaluated with respect to the values shown by a psychrometric chart that the resultant frequency or intensity of the current is a measure of the wet bulb temperature of the air.

For example, in one embodiment of this invention, the humidity of the air determines the power absorption of a hygroscopic dielectric between two condenser electrodes in an electrostatic field, while the dry bulb temperature determines independently, the strength of the field between the electrodes. A humidity increase causes an incrase in power absorption due to the increased absorption of moisture by the hygroscopic dielectric. A dry bulb temperature increase causes a bi-metallic element to increase the spacing between the electrodes, thus decreasing the capacity and the power absorption. The two changes are so correlated that a meter or a control in the oscillator circuit indicates or responds, respectively, to the prevailing wet bulb temperature.

In another embodiment of the invention, a humidity increase in the air may cause the frequency of an alternating electric current to increase, while an increase in the dry bulb temperature of the air may cause the frequency to decrease. The frequency changes are so correlated that the resultant of the changes indicates the wet bulb temperature of the air.

A humidity increase in the air to which a device embodying this invention is exposed, may also cause an impedance change in an electric circuit while a dry bulb temperature increase may cause an impedance change which is opposite in effect to that caused by the humidity increase. For example, a hygroscopic resistor connected in an electric circuit, decreases in resistance with increase in humidity while the resistance of another resistor in series therewith, is increased with increase in the dry bulb temperature.

Objects of the invention are to measure wet bulb temperatures and to actuate controls in response to wet bulb temperatures, by electronic action.

The invention will now be described with reference to the drawings, of which:

Fig. 1 is a diagrammatic view of one embodiment of this invention utilizing hygroscopic, book type electrodes, the capacity between the electrodes being varied by a bi-metallic element responsive to dry bulb temperature changes.

Fig. 2 is a diagrammatic view illustrating a condenser having plates coated with hygroscopic material and having plates rotated by a bi-metallic spring, and which may be substituted for the book type condenser of Fig. 1;

Fig. 3 is a diagrammatic view of a condenser which may be substituted for the book type condenser of Fig. 1, having two sets of rotary plates, one set being rotated by a coiled hygroscopic element affected by humidity changes and the other set being rotated by a coiled bi-metallic element affected by dry bulb temperature changes.

Fig. 4 is a sectional view along the lines 4—4 of Fig. 3;

Fig. 5 is a sectional view along the lines 5—5 of Figs. 2, 3 and 6;

Fig. 6 is a diagrammatic view of another embodiment of this invention utilizing an inductance instead of a condenser for responding to humidity changes, the inductance having relatively flat wires coated with hygroscopic material affected by humidity changes, the inductance being connected by a variometer to the oscillator, the rotor of the variometer being rotated by a coiled bi-metallic spring affected by dry bulb temperature changes;

Fig. 7 is a diagrammatic view of one oscillator circuit which may be employed in the practice of this invention;

Fig. 8 is a diagrammatic view of another oscillator circuit which may be employed in the practice of this invention;

Fig. 9 is a diagrammatic view of a third form of oscillator circuit which may be used in the practice of this invention;

Fig. 10 is a diagrammatic view of another embodiment of this invention in which a hygroscopic resistor is connected in series with a variable resistor in the grid circuit of a thermionic electron tube, the resistance of the variable resistor being adjusted by a dry bulb thermometer, the two resistors being in shunt with a D. C. voltage source;

Fig. 11 is a diagrammatic view of another embodiment of this invention, similar to that of Fig. 10 except that the voltage source is connected in series with the variable resistors;

Fig. 12 is a diagrammatic view of another embodiment of this invention, similar to that of Fig. 10 except that the electron tube is of the cold cathode type, and the voltage source need not be direct current.

Fig. 13 is a diagrammatic view of another embodiment of this invention, similar to that of Fig. 9 except that instead of the thermostatic element varying a capacity, it varies a resistor in series with the hygroscopic resistor;

Fig. 14 is a diagrammatic view of another embodiment of this invention using a relaxation type, resistance tuned oscillator;

Fig. 15 is a diagrammatic view of another embodiment of this invention similar to that of Fig. 11, except that a resistor, the value of which varies with temperature, is connected in series in the grid circuit of the control tube with a resistor, the value of which is varied with humidity, and Fig. 16 is a diagrammatic view of another embodiment of this invention utilizing an ohmmeter and a rectifier bridge circuit energized by alternating current.

Referring now to Fig. 1, the spaced metallic plates 10 and 11 form a book type condenser, the plate 10 being adapted and arranged to be rotated by the coiled by-metallic member 12 so that the spacing between the plates increases with increases in the dry bulb temperatures, and decreases with decreases in dry bulb temperatures. The capacity of the condenser thus decreases while its reactance increases, with increases in dry bulb temperatures, and its capacity increases while its reactance decreases, with decreases in dry bulb temperatures.

The plates 10 and 11 are connected as opposed electrodes to the high frequency oscillator 13, an oscillating high frequency electrostatic field being set up between the plates 10 and 11. The similar free electrode 14 is placed between the electrodes 10 and 11 and acts to increase the capacity of the condenser formed by the electrodes 10 and 11.

The inner surfaces of the electrodes 10 and 11 and both surfaces of the electrode 14 may be coated with a hygroscopic medium such, for example, as cellulose acetate dissolved in acetone and applied as a lacquer to the surfaces. The moisture absorbed by the coatings varies as the relative humidity of the air passing between the electrodes changes. The moisture absorption changes the condition of the dielectric between the electrodes and thereby changes the capacity and reactance of the condenser and changes the power absorbed by the hygroscopic dielectric from the electrostatic field.

The moisture absorption of the hygroscopic dielectric varies conformably with changes in the relative humidity of the air. The spacing between the electrodes 10 and 11 varies conformably with changes in the dry bulb temperature. The constants of the apparatus are so chosen as by observation of the effects through comparison with calibrated meters, that the resultant effect upon the oscillator 13 varies conformably with changes in the wet bulb temperature of the air.

The meter 15 connected in the oscillator circuit as will be described, serves to indicate the wet bulb temperature of the air, and the relay 16 connected in the oscillator circuit, serves to cause the device to act as a wet bulb thermostat for actuating controls of humidity changing devices when the oscillator current reduces a predetermined value.

Instead of coating the surfaces of the electrodes with a hygroscopic layer, a dielectric such as reverted cellulose may be placed between the electrodes as disclosed in the Allen Patent No. 1,708,073.

The oscillator 13 may be of the type disclosed in said Allen patent, or may be of the types disclosed in the Stevens et al. Patent No. 2,231,035, or may be of the type disclosed in the Terman Patent No. 1,976,904. Suitable circuits which may be used will be described in the foregoing in connection with Figs. 7-9.

Fig. 2 discloses a modified form of condenser which may be used. It is a conventional tuning condenser having stator plates 17 and rotor plates 18. The rotor plates 18 are rotated by a coiled bi-metallic member 12 such as shown by Fig. 5 so that increases in dry bulb temperature cause reductions in capacity as described in connection with Fig. 1. The member 12 is mounted on the shaft 19 on which the plates 18 are mounted, with its inner end in a slot in the shaft and its outer end held by the bracket 20 which is attached to the case 21. The plates 17 and 18 are coated with hygroscopic material as described in connection with Fig. 1, the overall effect being as in Fig. 1, of the hygroscopic absorption, and of dry bulb capacity variation, on an oscillator connected to the condenser of Fig. 2, to cause a response to wet bulb temperature.

Fig. 3 shows another form of condenser which may be used. Instead of the condenser plates being coated with hygroscopic material, it has two sets of rotary plates, one set being rotated by a coiled hygroscopic tape 22 in the case 23 while the other set is rotated by a coiled bi-metallic member as described in connection with Fig. 2. The humidity changes cause the tape 22 to rotate the plates more in mesh with the stator plates 18 to increase the capacity of the condenser, while the spring 12 rotates the other set of rotor plates 18 to decrease the capacity of the condenser. The resultant capacity varies conformably with wet bulb temperature changes.

The tape 22 may be a strip of cellulose applied to a strip of shim brass as disclosed in the Rollefson Patent No. 2,093,767, and fastened to the rotary shaft of its associated rotor plates as described above in connection with the support of the member 12 upon the shaft 19.

The rotor plates 24 could also be rotated by an elongated hygroscopic element as disclosed in the Allen Patent No. 1,781,153.

Fig. 6 illustrates how inductances may be adjusted conformably with relative humidity changes and dry bulb temperature changes for causing resultant effects which vary conformably with wet bulb temperature changes. The inductance 25 has its turns coated with hygroscopic material whereby the distributed capacity varies conformably with relative humidity changes, thus variably tuning the inductance.

The inductance 25 is connected to the rotor winding of the variometer 26, which winding may be the inductance 27 of Fig. 7, while the oscillator is connected by the wires 30 and 31 to two windings on the stator of the variometer, which windings may be the inductances 28 and 29 of Fig. 7. A coiled bi-metallic member rotates the rotor of the variometer to vary the effect of the inductance 25 upon the field from the oscillator, conformably with dry bulb temperature changes, for decreasing the coupling conformably with dry bulb temperature increases and for increasing the coupling conformably with dry bulb temperature decreases. The over all effect is, as described in connection with Figs. 1–5, that the oscillator is modified conformably with wet bulb temperature changes.

Fig. 7 discloses an oscillator circuit of the type disclosed in said Stevents et al. patent and in which a vacuum tube oscillator has an output voltage which falls with increase in load caused by increased power absorption between the electrodes 10 and 11, which increased power absorption is caused by increase in the moisture absorbed in the dielectric on the electrodes 10, 11, and 14. The decrease in voltage is indicated by the meter 15.

The bi-metallic member 12 acts as previously described, to increase the spacing between the electrodes 10 and 11, and thereby to decrease the power absorption, upon increase in dry bulb temperature. The meter 15 responds to the differences in power absorption due to moisture absorption and separation of the electrodes, and may be calibrated to indicate the resultant wet bulb temperatures.

The relay 16 connected in series with the meter 15 is adjusted so that it releases its armature 33 to close a control circuit when a predetermined wet bulb temperature occurs.

The oscillator circuit illustrated by Fig. 8 is of the type disclosed in said Terman patent and has a vacuum tube oscillator 34, the anode current of which increases conformably with the power absorption caused by moisture absorbed by the dielectric between the condenser electrodes 10 and 11. The bi-metallic element 12 acts to decrease the effect of this loss upon increases in dry bulb temperature by increasing the spacing between the electrodes. The meter 15 which in this case, preferably is a milliammeter, may thus be calibrated to read wet bulb temperatures, and the relay 16 may be adjusted to close a control circuit when a predetermined wet bulb temperature occurs.

The oscillator circuit of Fig. 9 includes a resistance tuned oscillator of the type disclosed in pages 333–344 of the June, 1941, issue of Proceedings of the Institute of Radio Engineers. The tuning condenser 36 has its capacity varied with changes in dry bulb temperature as disclosed in connection with Fig. 2 so as to decrease the capacity and increase the reactance upon increase in dry bulb temperature. The resistance 37 is a hygroscopic element of the type disclosed, for example, in the December, 1939, issue of the Journal of the National Bureau of Standards, the electrical resistance of which varies conformably with changes in the relative humidity of the air. The effects of the adjustments of the condenser 36 and the resistance 37 are to change the frequency of oscillation of the tube 35. A decrease in the impedance of the circuit caused by a decrease in capacity causes a higher frequency oscillation. A decrease in resistance resulting from an increase in humidity causes a decrease in frequency. The impedance changes are so adjusted that the frequency meter 15 connected across the inductance 38, may be calibrated to read wet bulb temperatures. The contact 39 on the scale of the meter is set at the desired control point so that the indicator 40 closes a control circuit when a predetermined wet bulb temperature occurs.

The embodiment of the invention illustrated by Fig. 10 comprises the hygroscopic resistor 50 which may be of the type disclosed in the F. W. Dumore Patent No. 2,285,421, the resistance of which decreases conformably with humidity increases in the air to which it is exposed. The resistor 50 is connected in series with the variable resistor 51, the contact arm 52 of which is varied by the bellows 53 connected by the tube 54 with the dry bulb thermometer 55.

The resistors 50 and 51 in series are connected in shunt with the D. C. voltage source 56 and with the control grid circuit of the thermionic tube 57.

The energizing winding of the relay 58 is connected to the anode 59 of the tube 57 and to the junction point of the resistor 60 and one side of the potentiometer 61. The anode 59 is also connected through the resistor 64 to the contact arm 62 of the potentiometer 61, the other side of which is connected to the positive side of the B supply source 63. The minus side of the source 63 is connected to ground.

The relay 58 is connected in a bridge circuit in the tube anode circuit and when the potentiometer 61 is adjusted until the relay contacts swing wide open, the bridge circuit is balanced. An increase in voltage at the grid of the tube will cause the bridge circuit to unbalance and the relay contacts to close. Such a voltage increase will be caused by an increase in wet bulb temperature, the resistance of the resistor 50 decreasing conformably with humidity increases and the effective resistance of the resistor 51 increasing conformably with dry bulb temperature increases. The constants of the circuit are so selected that the bridge circuit is unbalanced to close the relay contacts when a predetermined wet bulb temperature occurs.

The embodiment of the invention illustrated by Fig. 11 is similar to that of Fig. 10 except that no bridge circuit is included in the anode circuit of the thermionic control tube, the circuit being balanced by auxiliary variable resistors in the anode and grid circuits. The common elements of Figs. 10 and 11 have been given the same reference characters.

With reference to Fig. 11, the hygroscopic resistor 50, the variable resistor 51 adjusted by the thermometer 55, the auxiliary variable resistor 66 and the D. C. voltage source 56 are connected in series across the grid circuit of the tube 59. The variable resistor 66 is connected in series with the anode 59, the energizing winding of the relay 58 and the B supply 63. The resistors 65 and 66 are adjusted to provide that the contacts of the relay 58 close at a predetermined wet bulb temperature.

The tube 57 of Figs. 10 and 11 may be of the so-called high vacuum type, or may be of the gaseous type in which a flash over occurs at a predetermined grid potential.

The embodiment of the invention illustrated by Fig. 12 uses a cold cathode tube, the cathode 68 of which is connected to one side of the voltage source 69 which may be A. C. or D. C. The other side of the supply 69 is connected to the hygroscopic resistor 50 which is in series with the variable resistor 51, the balancing resistor 70 and the starting anode 71 of the tube 67. The energizing winding of the relay 58 is connected in series with the said other side of the source 69 and with the anode 72 of the tube 67. With such a cold cathode tube, anode current flows when the starting the anode is raised to the ignition potential. The constants of the circuit may be chosen so that when a predetermined wet bulb temperature occurs, the sum of the resistances of the resistors 50 and 51 decreases to permit the starting anode 71 to be charged from the source 69, to the ignition potential.

The oscillator circuit of Fig. 13 incluaes a resistance tuned oscillator similar to that of Fig. 9, except that instead of the dry bulb thermostatic element varying a condenser, it varies a resistor in series with the hygroscopic resistor. The resistance of the hygroscopic resistor 37 decreases with increase in humidity. The resistor 80 in series with the resistor 81 has its resistance increased with increases in dry bulb temperature by the expansion of fluid from the thermometer 83 into the bellows 82 which shifts the contact arm 81 of the resistor 80. Increases in resistance cause increases in frequency. The constants of the circuit are so adjusted that the frequency meter 15 may be calibrated to read wet bulb temperatures and to actuate controls at a predetermined wet bulb temperature.

The oscillator circuit of Fig. 14 is a conventional, relaxation type oscillator. The hygroscopic resistor 85 and the resistor 86, the resistance of which is adjusted by the bellows 87 of the thermometer 88, are connected in series in the control grid circuit of the thermionic tube 89.

The resistors 90 and 97 are limiting resistors and the condenser 91 is the feedback condenser. The resistance of the resistor 85 decreases with humidity increases and the resistance of the resistor 86 increases with dry bulb temperature increases. The sum of the resistances of the resistors 85 and 86 determines the frequency of oscillation of the tube 89 and is an indication of the wet bulb temperature. The output of the tube 89 may be amplified by the audio amplifier 92 to which the frequency meter 93 is connected and which may be calibrated in terms of wet bulb temperatures.

Fig. 15 illustrates a control circuit similar to that of Fig. 11 except that no hygroscopic resistor is used. The resistor 94 is of a metal such as platinum or nickel, the resistance of which increases with increase in temperature. The resistor 95 in series therewith has its contact arm adjusted by a coiled hygroscopic element 96 such as that illustrated by Fig. 4 so that increases in humidity cause decreases in the effective resistance of the resistor 95. The sum of the resistances of the two resistors determines the potential on the grid of the tube 57 as described in connection with Fig. 11, the tube passing sufficient anode current to actuate the relay 58 at a selected wet bulb temperature.

Fig. 16 illustrates a control circuit in which no vacuum tube is necessary. The A. C. source 100 may be 60 cycle alternating current. It is connected by the wire 101 to the resistor 102, the contact arm 103 of which is moved by the bellows 104 of the dry bulb thermometer 105. The hygroscopic resistor 106 is connected by the contact arm 103 and to one side of the input of the full wave, copper oxide rectifier 107. The other side of the input of the rectifier is connected by the wire 108 to the other side of the source 100. The output of the rectifier is connected to the ohmmeter or voltmeter 109.

The resistance of the hygroscopic resistor 106 decreases with increase in humidity while the resistance of the resistor 102 increases with increase in dry bulb temperature. The constants of the circuit can be so chosen and the meter 109 so calibrated that it reads wet bulb temperatures, and its pointer 110 closes a circuit at a predetermined wet bulb temperature to actuate a relay.

The impedance of an electric circuit is made up of the resistance and of the capacitive and inductive reactance of the components of the circuit. Varying one or more of these as described in the foregoing, varies the electrical impedance.

In the annexed claims, "conformably" means in proportion. For example, a humidity increase from minimum to maximum may cause a resistance to decrease from maximum to minimum, and a dry bulb temperature increase from minimum to maximum may cause a resistance to increase from minimum to maximum.

The devices referred to in the annexed claims may be thermostats for actuating controls at selected wet bulb temperatures, or may be thermometers for indicating wet bulb temperatures, or may be combined thermostats and thermometers.

While embodiments of the invention have been described for the purpose of illustration, it should be understood that the invention is not limited to the exact apparatus, arrangements of apparatus and circuits illustrated, as modifications thereof may be suggested by those skilled in the art without departure from the essence of the invention.

What is claimed is:

1. A device responsive to changes in the wet bulb temperature of air, comprising an electric circuit, means in said circuit responsive to humidity increases in the air for varying the electrical impedance of said circuit conformably with changes in the humidity of the air, and means in said circuit responsive to dry bulb temperature increases in the air for oppositely varying the impedance of said circuit conformably with changes in the dry bulb temperature of the air.

2. A device responsive to changes in the wet bulb temperature of air, comprising an electric circuit, means in said circuit responsive to humidity changes in the air for decreasing the electrical impedance of said circuit conformably with increases in the humidity of the air, and means in said circuit responsive to dry bulb temperature changes in the air for increasing the impedance thereof conformably with increases in the dry bulb temperature of the air.

3. A device responsive to changes in the wet bulb temperature of air, comprising an electric circuit, means providing an electric capacity in said circuit, means including means responsive to humidity changes in the air for varying the capacitive reactance of said capacity conformably with increases in the humidity of the air, and means including means responsive to dry bulb temperature changes in the air for oppositely varying the capacitive reactance of said capacity conformably with increases in the dry bulb temperature of the air.

4. A device responsive to changes in the wet bulb temperature of air, comprising an electric circuit, means in said circuit responsive to humidity changes in the air for varying the resistance of said circuit conformably with increases in the humidity of the air, and means in said circuit responsive to dry bulb temperature changes in the air for oppositely varying the resistance of said circuit conformably with increases in the dry bulb temperature of the air.

5. A device responsive to changes in the wet bulb temperature of air, comprising an electric circuit, a resistor in said circuit, means responsive to humidity changes in the air for decreasing the resistance of said resistor conformably with increases in the humidity of the air, a second resistor in said circuit, and means responsive to dry bulb temperature changes in the air for increasing the resistance of said second resistor conformably with increases in the dry bulb temperature of the air.

6. A device responsive to changes in the wet bulb temperature of air, comprising an electric circuit, an electric resistor in said circuit exposed to the air and having a resistance which increases conformably with increases in the dry bulb temperature of the air, and means in said circuit responsive to humidity changes in the air for decreasing the resistance of said circuit conformably with increases in the humidity of the air.

7. A device responsive to changes in the wet bulb temperature of air, comprising means including means exposed to air, providing an electric current flow, means for changing the strength of said current conformably with increases in the moisture content of the air, and means including means responsive to dry bulb temperature changes in the air for oppositely changing the strength of said current conformably with increases in the dry bulb temperature of the air.

8. A device responsive to changes in the wet bulb temperature of air, comprising means including hygroscopic means exposed to the air for producing an electric current flow, the strength of which varies in one direction conformably with increases in the moisture content of the air, and means including means responsive to dry bulb temperature changes in the air for varying the strength of said current flow in the opposite direction conformably with increases in the dry bulb temperature of the air.

9. A device responsive to changes in the wet bulb temperature of air, comprising an electric condenser, means including means responsive to humidity changes in the air for increasing the capacity of said condenser conformably with increases in the moisture content of the air, and means exposed to the air for decreasing the capacity of said condenser conformably with increases in the dry bulb temperature of the air.

10. A device responsive to changes in the wet bulb temperature of air, comprising means for producing an alternating electric current, means including hygroscopic means exposed to the air for varying the frequency of said current conformably with moisture increases in the air, and means including means responsive to dry bulb temperature changes of the air for oppositely varying the frequency of said current conformably with increases in the dry bulb temperature of the air.

11. A device responsive to changes in the wet bulb temperature of air, comprising means for producing an alternating electric current, means including hygroscopic means exposed to the air for decreasing the frequency of said current conformably with increases in the moisture content of the air, and means including means responsive to dry bulb temperature changes of the air for increasing the frequency of said current conformably with increases in the dry bulb temperature of the air.

12. A device responsive to changes in the wet bulb temperature of air, comprising an electric circuit, a pair of resistors in series in said circuit, means responsive to changes in the humidity of the air for decreasing the resistance of one of said resistors conformably with increases in the humidity of the air, and means responsive to changes in the dry bulb temperature of the air for increasing the resistance of the other of said resistors conformably with increases in the dry bulb temperature of the air.

ROBERT T. PALMER.